United States Patent
Martinez

[11] 3,792,948
[45] Feb. 19, 1974

[54] AUTOMATIC DOUGH ROLLING APPARATUS

[76] Inventor: James A. Martinez, 6239 Redbird Dr., Pico River, Calif. 90660

[22] Filed: Oct. 6, 1971

[21] Appl. No.: 187,108

[52] U.S. Cl. ................ 425/182, 425/337, 425/367
[51] Int. Cl. ............................................. A21c 3/02
[58] Field of Search ... 425/335, 337, 367, 223, 363, 425/194, 182; 198/184; 271/75, 49, 59, 69

[56] References Cited
UNITED STATES PATENTS

| | | | |
|---|---|---|---|
| 2,907,286 | 10/1959 | Ruiz | 425/337 |
| 821,860 | 5/1906 | Colborne et al. | 425/337 |
| 2,619,048 | 11/1952 | Fox | 425/335 |
| 2,190,416 | 2/1940 | Davidson | 271/49 |
| 1,871,753 | 8/1932 | Smith | 425/337 |
| 3,129,674 | 4/1964 | Jahn | 425/337 X |

Primary Examiner—J. Spenser Overholser
Assistant Examiner—David S. Safran
Attorney, Agent, or Firm—J. Carroll Baisch

[57] ABSTRACT

There is disclosed an apparatus for rolling bakery dough to a desired thickness, comprising an upper set of rollers, one of which is adjustable relative to the other for controlling the thickness of the dough that is passed therebetween. Positioned adjacent the lower area of the upper set of rollers is a slide plate on which the flattened dough is deposited and from which it slides downwardly and is guided to an automatic feeding device which moves horizontally and rearwardly at right angles to the slide plate, thereby automatically feeding the dough into a second set of lower rollers. These lower rollers are also adjustable to provide any thickness of dough that might be required. The power for operating the upper and lower sets of rollers, as well as the automatic feeding device, is provided by an electric motor adapted to be operably connected to the sets of rollers and feeding device by a pulley drive and a plurality of gear chain drives.

5 Claims, 5 Drawing Figures

AUTOMATIC DOUGH ROLLING APPARATUS

BACKGROUND OF THE INVENTION

1. Field of the Invention

This invention relates to an apparatus for rolling dough to a required thickness, and more particularly to an apparatus that will automatically roll each portion of the dough placed therein to a required thickness, to provide a larger volume of dough to be processed therethrough for any given period of time.

2. Description of the Prior Art.

As is well known in the art, various problems and difficulties have been encountered in providing an apparatus having suitable means whereby baking doughs used by cooks, bakers and the like can be rolled to a desired thickness and shape for a smooth, continuous production. This type of large production is generally found in such establishments as pizza parlors, bakeries and commissaries. In pizza houses the dough is flattened to various diameters having various thicknesses, and it is necessary to provide freshly shaped dough as each pizza is made. However, in bakeries and commissaries, not only is dough shaped for pizza pies but, in addition, other large quantities of items are needed to be produced such as pie crust, sweet doughs, cinnamon rolls and the like products, as well as flour tortillas. Hence, there is needed an apparatus to produce various bakery products of various sizes and shapes in large quantities, without the aid of an individual once the dough is deposited in the apparatus. Generally, it is found that the existing apparatuses for rolling dough have only one set of rollers in which the piece of dough is continuously re-fed into the same set of rollers by hand until the desired shape is achieved. As can be understood, this takes time and not all end products are the same. A second apparatus has two sets of rollers. However, as the dough leaves the first set it has to be handled and fed into a second set. This, also, requires time and labor that is not necessary. With the demand for large orders of items, there is often careless and loose handling, with the end result being an inferior product or the operator being injured.

To the applicant's knowledge, there is no apparatus having features to completely automate the process of rolling bakery dough from a ball-like mass to a specific thickness and circumference, particularly in very large quantities.

SUMMARY OF THE INVENTION

The present invention discloses an apparatus for automatically producing a specific size and thickness of a sheet of dough, such as required for making pizza, bakery goods, and like items, on a large production basis. This apparatus comprises a frame housing adapted to operably support an upper set of rollers which receives the initial segment of dough. At least one of the rollers is adjustable relative to the other, whereby the dough that is passed therethrough can be given a predetermined thickness. As an example, when a 15 inch sheet of dough is required for a pizza, approximately 8 ounces of dough is fed into the first set of upper rollers, the dough passing therebetween and pressed to a thickness of one-eighth of an inch, 9 inches long and 4 inches wide. From the rollers the dough drops into a slide plate which feeds the flattened dough directly onto a feeding device such as a conveyor belt. The belt rotates in a rearward direction at 90° to the slide having its terminating point adjacent the opening between a second set of lower rollers, the dough being transported on said belt which automatically feeds the flattened sheet of dough into a predetermined shape provided by the adjustment of at least one of the rollers of the second set. At this time, using the example of pizza dough, it is formed into a circular sheet having a diameter of approximately 15 inches with a thickness of one-sixth of an inch. However, various sizes and thicknesses can be provided, depending on the adjustment of each set of rollers.

A power means is provided to operate the entire apparatus as a single unit. This power supply is shown as an electric motor supported within the frame structure and driving a power take-off unit by means of pulleys and a pulley belt. The power take-off unit is provided with two separate drive shafts, one being adapted to drive the upper set of rollers and the other drive shaft being adapted to drive the second, lower set of rollers, together with the operating of the automatic feeding device.

The upper set of rollers is so arranged with the driving means that said rollers rotate inwardly in opposite directions, forcing the dough which is fed therebetween in a downward direction. When the dough reaches the automatic feeding machine which consists of a conveyor belt, it is transported rearwardly by the rearward movement of the belt which is provided with a separate drive means indirectly driven by the electric motor. Hence, the second set of rollers is rotating, each of said rollers again operating in an inward direction opposite one another by means of a second chain and sprocket drive system. Thus, the dough is automatically fed into the second set of rollers as it leaves the conveyor belt. As the dough leaves the last set of rollers, it is received on a slide plate and deposited for further processing.

OBJECTS AND ADVANTAGES OF THE INVENTION

The present invention has for an important object a provision whereby dough for making bakery goods is automatically fed from one set of rollers to a second set of rollers.

It is another object of the present invention to provide an automatic dough rolling apparatus that is capable of forming dough into a predetermined shape without manual assistance after the apparatus is adjusted.

It is still another object of the invention to provide an automatic dough rolling apparatus which contains a self-feeding device between a first set of rollers and a second set of rollers.

It is a further object of the invention to provide an apparatus of this character whereby the production time is considerably increased.

It is still a further object of the invention to provide an apparatus of this character that is easy to service and maintain.

Still another object of the invention is to provide an apparatus of this character that is relatively inexpensive to manufacture.

It is still another object of the invention to provide an apparatus of this character that is simple and rugged in construction.

Other characteristics, advantages and objects of this invention can be more readily appreciated from the following description and appended claims. When taken in conjunction with the accompanying drawings, this description forms a part of the specification wherein like references and characters designate corresponding parts in several views.

DESCRIPTION OF THE DRAWINGS

Referring more particularly to the accompanying drawings, which are for illustrative purposes only.

DESCRIPTION OF THE PREFERRED EMBODIMENT

Referring more particularly to the drawings, there is shown a dough rolling apparatus, indicated generally at 10, having an automatic feeding device incorporated therein, which is generally indicated at 12. The above apparatus can be mounted in any convenient manner or place but for illustrative purposes it is shown mounted on a frame structure 14.

Figure 3:
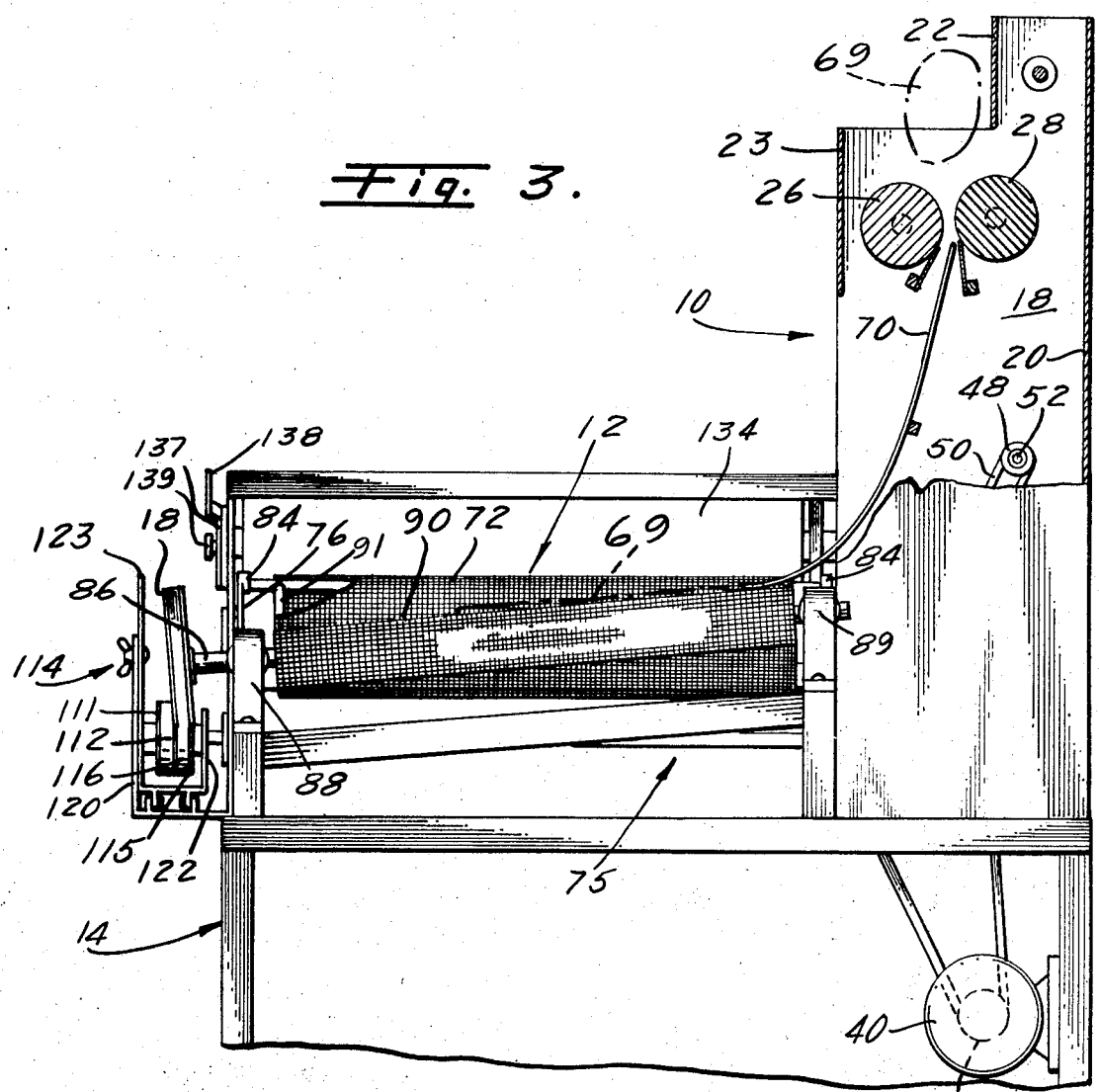
FIG. 3 is a front-elevational view thereof with a portion of the frame housing broken away to better show the first set of rollers disposed therein.
Figure 5:
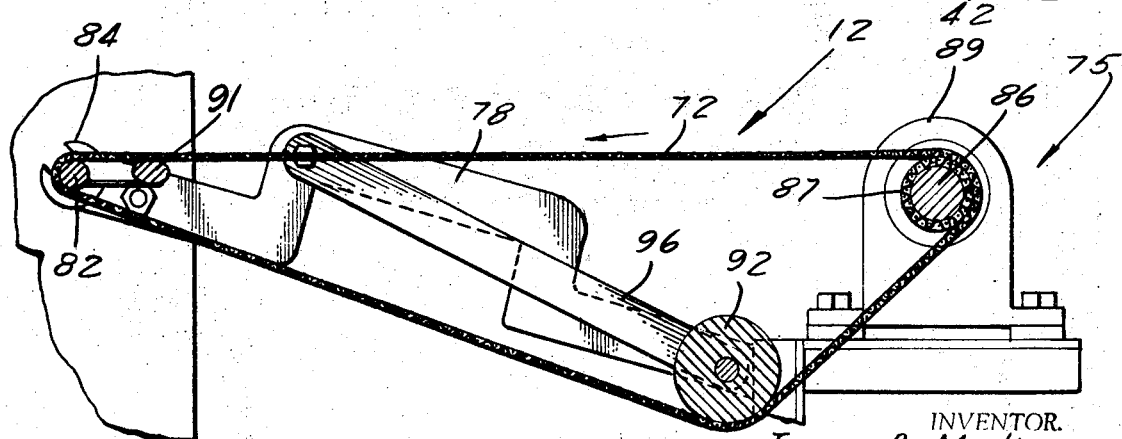
FIG. 5 is an enlarged cross-sectional view taken on line 5—5 of FIG. 4.
Figure 4:
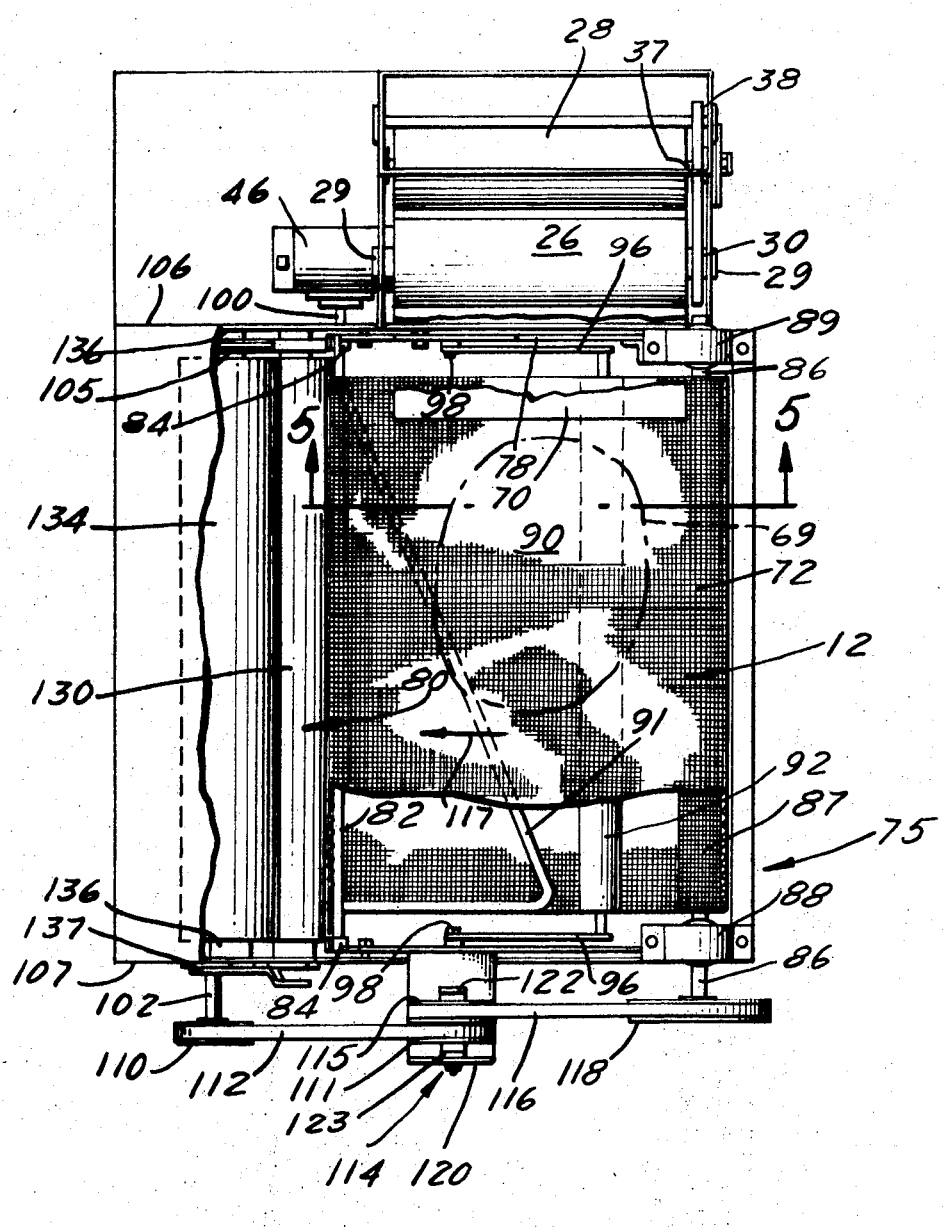
FIG. 4 is a top plan view with a portion broken away to more clearly illustrate the arrangement of the conveyor in relation to the roller units.

One portion of the dough rolling apparatus comprises a frame-like housing 16 defined by upright, elongated side walls 18 and 19, a rear wall 20, and front partitions 22 and 23. Within this defined area there is horizontally disposed a first means for shaping a piece of dough when placed therein. This means comprises a first set of upper rollers, generally indicated at 24, having a front roller 26 and a rear roller 28, as shown in FIGS. 3 and 4. Roller 26 is rotatably supported in bushing members 29 affixed to each side wall 18 and 19, respectively, said roller 26 being adapted at one end thereof with a sprocket 30. The rear roller 28 of this set is also rotatably supported to each side wall. However, the free ends of said roller are operably mounted within oppositely disposed, eccentric bearings. Said eccentric bearings provide for the adjustment of roller 28. That is, depending on the required thickness of the dough, after passing between both rollers, said roller 28 is adjusted about the eccentric bearings and is positioned the necessary distance from the front roller 26 to provide the required space therebetween, in order for the dough that passes therethrough to be formed as desired. The setting of the proper space between both rollers is accomplished by an adjusting means 32 which includes a plate 33 having a handle 34 integrally attached thereto, said plate being attached to one of said eccentric bearings. After the adjustment is made for the proper distance the plate 33 is locked into position by means of a short threaded knob 36. It is to be noted that this only locks the roller 28 in a spaced relationship to that of roller 26 and does not affect the rotation thereof, as the shaft 37 of roller 28 is adapted with a fixed sprocket 38 similar to that of sprocket 30 of roller 26.

The sprockets 30 and 38 are operably interconnected by a drive means which includes an electric motor 40 disposed below the apparatus 10 and fixedly mounted to frame 14, said motor having a pulley 42 attached to its shaft 43 for operable engagement with an enlarged pulley 44 positioned above the motor 40 and mounted on a drive shaft 45 of a gear box 46. Said shaft 45 is also adapted to fixedly receive a drive sprocket 47 (FIGS. 1 and 2) which is operably connected to sprocket 48 by chain drive 50, said sprocket 48 being mounted at one end of shaft 52 for rotation thereof within bearing members 54 attached to each side wall 18 and 19, respectively. Oppositely disposed from sprocket 48 and shaft 52 is a second sprocket member 55 for driving chain 56. This chain loops around an upper idler sprocket 58 supported by shaft 60 at the upper portion of the housing 16 and then passes under sprocket 38 of roller 28, then over sprocket 30 of roller 26 back to shaft 52. There is also positioned within the chain loop a spring-loaded idler pulley 62 which provides proper tension on the chain during the operation of said apparatus. Due to the direction of movement of the chain, indicated by arrow 64, the sprocket 26 will rotate in a counter-clockwise direction while the roller 28 rotates in a clockwise direction, thereby feeding the dough therebetween and downwardly where it is removed from the roller surfaces by oppositely disposed scrapers 66 and 67, respectively. Each scraper is biased against the surface of each corresponding roller by springs 68.

From this point the dough is shaped. For example, if an 8 ounce piece, as indicated at 69, is used for pizza, it would take a configuration of approximately 9 inches long, having a width of 4 inches and the thickness of one-eighth of an inch. These figures vary, depending on the end product desired and how the apparatus is adjusted. The dough leaves the rollers and slides downwardly on a slide plate 70, as seen in FIG. 3. The upper end of said slide plate is disposed below and between the upper roller set 24, and extends downwardly and terminates just above the automatic feeding device 12. The dough 69 is deposited on a continuously traveling belt member 72, said belt being shown as a flexible plastic or neoprene but it should be understood that it may be of other material such as, for example, an endless flexible screen or steel wire which serves the same end result. In order to provide a more efficient reception of the flat piece of dough from the slide plate 70, the forward leading portion of the belt is arranged to be inclined downwardly from the side that is overlapped by the slide plate. This permits the dough to be more centrally positioned on the belt 72.

Figure 1:
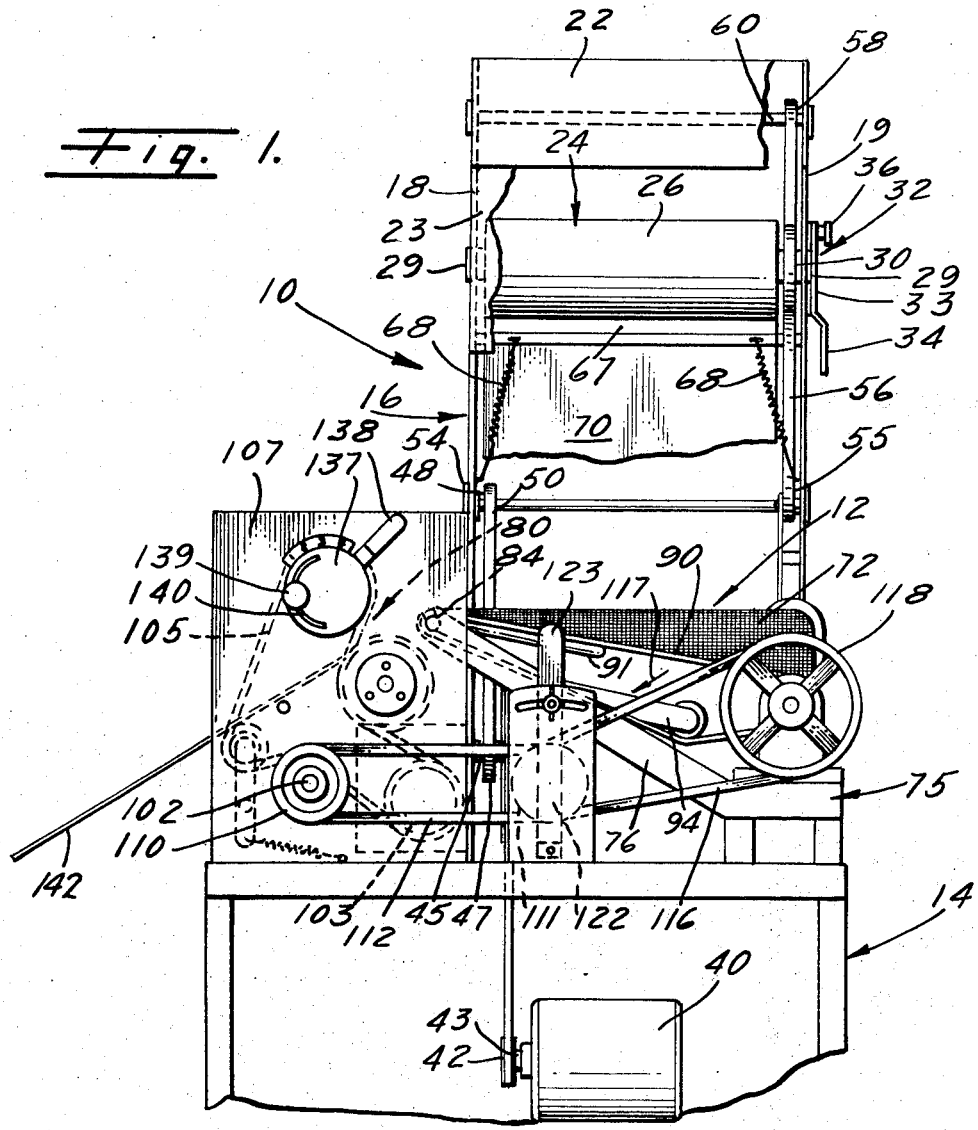
FIG. 1 is a side-elevational view of the present invention with portions thereof broken away.
Figure 2:
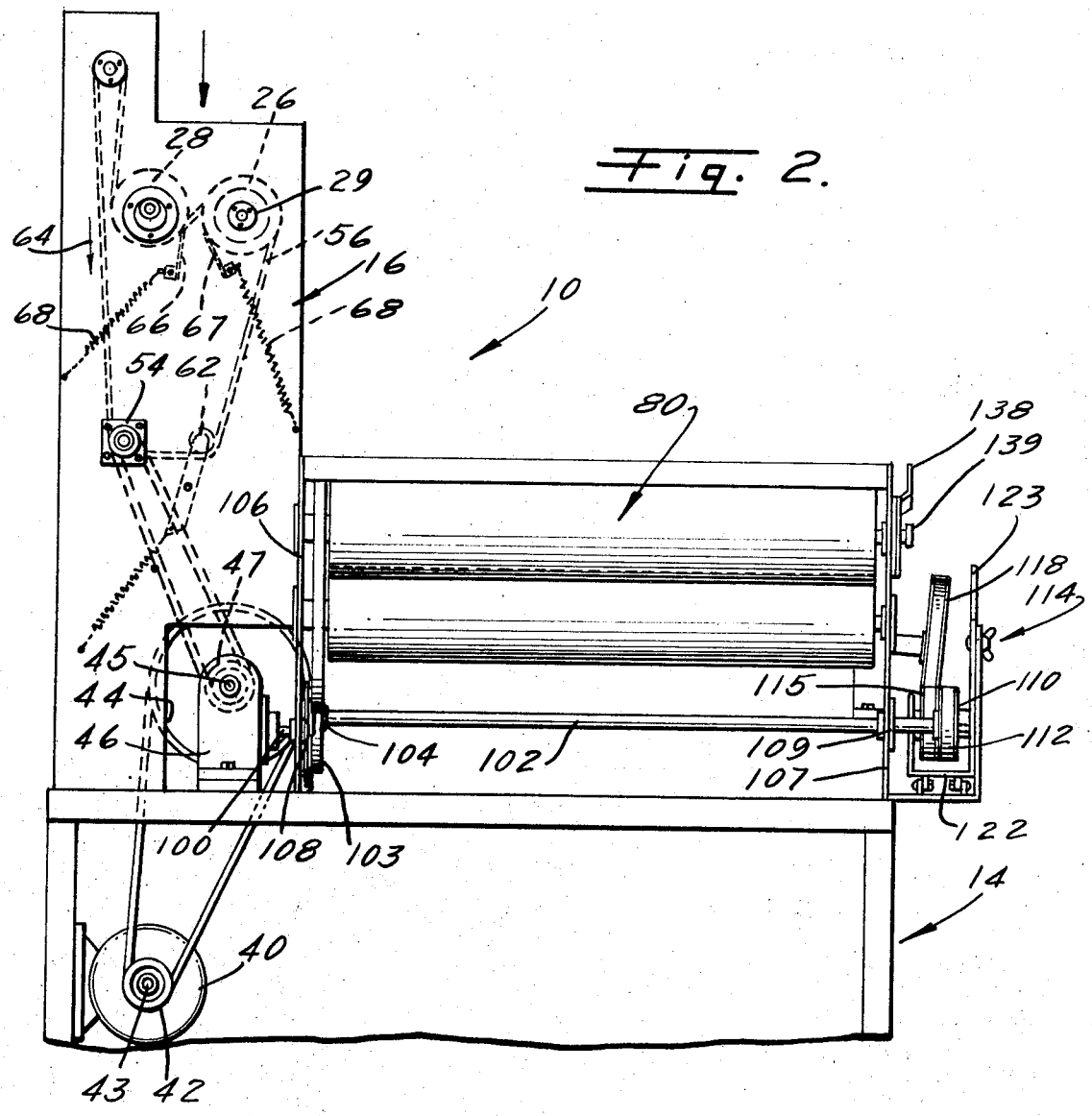
FIG. 2 is a rear-elevational view of the invention.

The feeding device 12 is mounted to a second portion of the apparatus comprising a frame-like structure, indicated generally at 75, having extending support arms 76 and 78, said arms extending rearwardly, as seen in FIGS. 1 and 4, to a point adjacent a second set of rollers, indicated generally at 80. The arms are oppositely disposed along the edges of the belt 72 having one end fixedly secured to the frame 75 and the opposite end free to receive a guide bar 82 by means of a forked neck 84.

The belt 72 is formed as a continuous, flexible conveyor being driven by an operable shaft 86 having a frictional cover 87 enclosing the part of the shaft that supports the belt, said frictional cover being shown as a layer of screen. However, this, too, may comprise various frictional materials whereby the entire width of the belt is driven without slippage. The drive shaft 86 is operably supported within support bearings 88 and 89, said bearings being adaptable to various angles, such as seen in FIG. 3 in which bearing 88 is positioned lower than bearing 89, permitting the shaft 86 disposed therein to be inclined downwardly from bearing 89. The belt, therefore, follows this contour, providing a somewhat subjacent area 90 at the point the dough 69 leaves the slide plate 70. In order to provide proper support for said area 90, a somewhat triangularly shaped leg member 91 is affixed to guide bar 82. Said leg member prevents sagging of the flexible belt, regardless of the weight of said dough placed thereon. Tension is continuously applied to the belt 72 by means of a horizontal roll bar 92 which is pivotally attached to said opposite arms 76 and 78 by its own arms 94 and 96, respectively, by means of bolts 98.

A separate drive system is used to supply movement to the belt 72 through a series of pulleys and belts indirectly connected to the motor 40. That is, a take-off shaft 100 of the gear box 46 imparts a rotational movement to shaft 102 through sprockets 103 and 104 by means of chain 105. Shaft 102 extends horizontally through a second housing defined by walls 106 and 107, and is rotatably supported therein by bearings 108 and 109, respectively. Shaft 102 extends outwardly beyond the wall 107 (see FIGS. 2 and 4) and is adapted to fixedly receive pulley 110, said pulley being operably engaged with a pulley 111 by pulley belt 112. Pulley 111 is part of a pulley belt tension-adjusting means, indicated generally at 114. This means also includes a second pulley 115 which is secured to the adjacent pulley 111 for rotation therewith. By this arrangement, belt 116 will operate in the direction of arrow 117, thereby causing an enlarged pulley 118 to rotate in a counter-clockwise direction, imparting the same directional movement 117 to the flexible feeding belt 72 through shaft 86, to which pulley 118 is attached. The tensioning means 114 is comprised, not only of the pulleys 111 and 115, but also includes a support bracket 120 having a pivotal yoke member 122 adapted with a handle 123, said yoke being the member that cradles and operably supports both pulleys 111 and 115, respectively.

Hence, the dough 69, being in a somewhat eliptical form at the time it is carried by belt 72, is fed into the inwardly rotating set of rollers 80 which includes a lower roller 130 disposed adjacent to but slightly below the leading edge 131 of the belt 72 so as to be somewhat superposed thereby to better receive the flattened dough 67. As the roller 130 receives the dough, it draws the dough inwardly due to its counter-clockwise rotation and passes said dough between its radial surface and the radial surface of the adjacent roller 134 which is disposed above said roller 130 and to the rear thereof, as seen in FIGS. 1 and 4. Roller 134 is adjustable, as is roller 28 of the first set of rollers 24, said roller 134 being rotatably supported in the walls 106 and 107 by adjustable eccentric bearings 136. One of the bearings is provided with an adjustable plate member 137 having a handle 138 which is selectively positioned for the proper spacing of the relative rollers by a set pin and knob 139 threadably received in side wall 107 through the arched slot 140 provided in plate member 137. The spacing of the rollers will depend, as mentioned above on the product that is to be produced. Using, again, the pizza sheet 69 as an example, the dough is fed into the second set of rollers 80 from the conveyor belt 72 and is pressed as it passes therethrough to form a configuration of a flat, thin sheet of circular dough having approximately a 15-inch diameter and the thickness of one-sixteenth of an inch. Thus, as the dough leaves the second set or rollers it is deposited on an adjacent slide plate 142, at which time the dough forming process is ended.

Thus, it can be readily understood that various forms and configurations can be applied to bakery dough placed within the apparatus 10 by adjusting the settings of each set of rollers. In addition to the pizza dough example given herein, other products such as pie doughs, sweet doughs, coffee cake, cinnamon rolls and the like can be produced at a higher rate of production than was heretofor obtainable.

The invention and its attendant advantages will be understood from the foregoing description and it will be apparent that various changes may be made in the form, construction and arrangement of parts of the invention without departing from the spirit and scope thereof or sacrificing its material advantages, the arrangements hereinbefore described being merely by way of example, and I do not wish to be restricted to the specific forms shown or uses mentioned, except as defined in the accompanying claims.

I claim:

1. A dough rolling apparatus comprising:

a frame housing having an upper and a lower section;

a first set of roller means disposed in said upper section of said frame housing;

a second set of roller means disposed in said lower section of said frame housing, wherein said first and second roller means are adjustable to control the thickness of said dough when said dough passes therethrough;

said first and second roller means comprises:

a pair of rollers, wherein at least one of said rollers is operably adjustable relative to its adjacent roller;

means for adjusting said adjustable rollers to a set position within said housing;

an automatic feeding device positioned below said first roller means and horizontally aligned and adjacent the entrance to said second set of roller means, and wherein said automatic feeding device comprises:

an endless flexible belt;

a drive shaft disposed within the loop of said endless belt for imparting movement thereto;

a support bar disposed within said loop of said belt and oppositely disposed to that of said drive shaft; and tensioning means disposed adjacent one surface of said flexible belt a power drive assembly operably connected to each of said roller means and said automatic feeding device; and said drive shaft of said feeding assembly being inclined downwardly from said first set of roller means and said support bar is disposed in a horizontal plane thereto, said flexible belt thereby forming a subjacent area for receiving said dough formed by said first set of roller means.

2. An apparatus as recited in claim 1, wherein said feeding assembly includes a pair of oppositely disposed, extending arms having at their free ends means for removably receiving said support bar therein.

3. An apparatus as recited in claim 2, wherein said power drive assembly comprises:

A. a power operated motor;

B. a plurality of drive means, each being indirectly and operably connected to said motor and correspondingly operably connected to said first and second roller means and feeding assembly.

4. An apparatus as recited in claim 3, including a slide plate having one end thereof parallel and adjacent the opening between said pair of rollers in said first roller means, the opposite end terminating adjacent and above a portion of said flexible belt whereby said pressed dough can be deposited thereon.

5. An apparatus as recited in claim 4, wherein said flexible belt moves in a direction normal to the rotation of said first roller means and positioned in the same plane as said second roller means, whereby said dough on said flexible belt is fed directly into said second roller means.

* * * * *

Disclaimer and Dedication

3,792,948.—*James A. Martinez*, Pico Rivera, Calif. AUTOMATIC DOUGH ROLLING APPARATUS. Patent dated Feb. 19, 1974. Disclaimer and dedication filed Oct. 7, 1974, by the inventor.

Hereby disclaims and dedicates to the Public claims 1–5 of said patent.

[*Official Gazette May 20, 1975.*]